Feb. 22, 1949. F. H. DRAKE ET AL 2,462,369
BEAD THERMISTOR
Filed Oct. 10, 1946 2 Sheets-Sheet 1
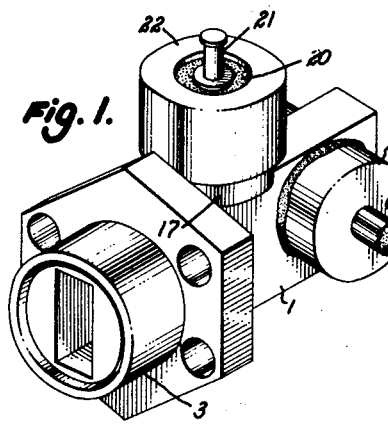
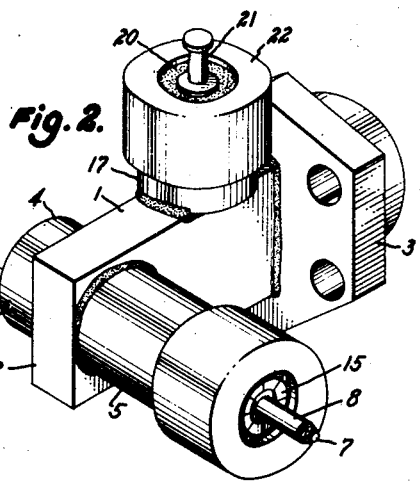
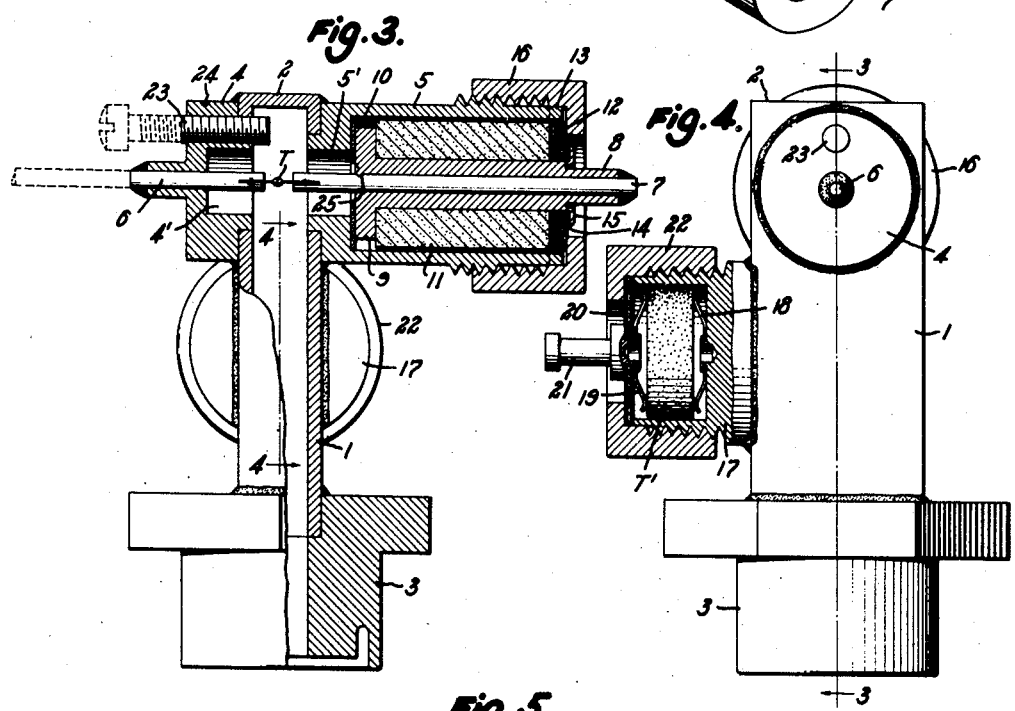
Inventors:
Frederick H. Drake,
Paul B. King, Jr.,
By Pierce, Scheffler & Parker,
Attorneys.

Feb. 22, 1949.                    F. H. DRAKE ET AL                    2,462,369
                                    BEAD THERMISTOR
Filed Oct. 10, 1946                                              2 Sheets—Sheet 2
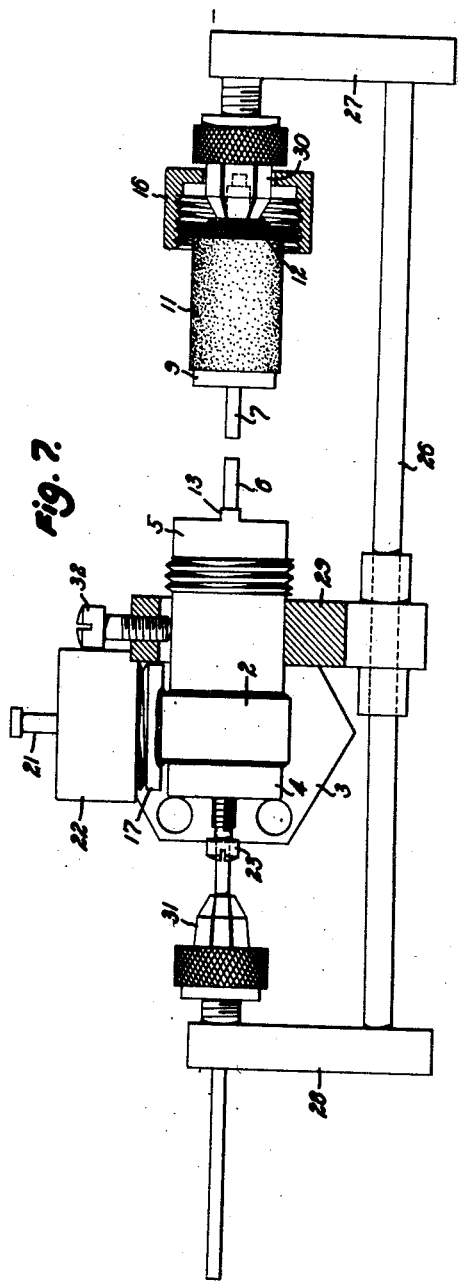
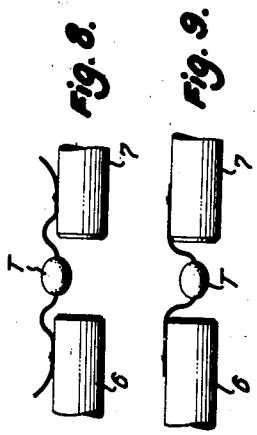
Inventors:
Frederick H. Drake,
Paul B. King, Jr.,
By Pierce, Scheffler & Parker
Attorneys.

Patented Feb. 22, 1949

2,462,369

UNITED STATES PATENT OFFICE 2,462,369

BEAD THERMISTOR

Frederick H. Drake, Boonton, and Paul B. King, Jr., Mountain Lakes, N. J., assignors to Aircraft Radio Corporation, Boonton, N. J., a corporation of New Jersey Application October 10, 1946, Serial No. 702,373

14 Claims. (Cl. 201—63)

This invention relates to bead thermistors, and more particularly mounted thermistors and to methods of assembling the same.

The name "thermistor" is a contraction of "thermally sensitive resistor" and identifies a circuit element in which the electrical resistance varies widely with temperature. Thermistors are manufactured as disks, rods or beads, and the present invention relates to bead thermistors such as employed in sensitive current and power measuring circuits. In this application, the unknown power to be measured is dissipated in the thermistor with consequent rise in temperature, and the thermistor resistance which is dependent upon its temperature thus affords a measure of the power dissipated.

Objects of the invention are to provide mounted thermistor assemblies of relatively small size, and to methods of assembling the same to obtain substantial uniformity in operating characteristics. An object is to provide mounted thermistors which are characterized by a simple leak-proof construction and a quarter-wavelength isolation of the thermistor. A further object is to provide a thermistor mounting which includes an adjustable element for controlling the operating characteristics of the thermistor.

These and other objects and advantages of the invention will be apparent from the following specification when taken with the accompanying drawing in which:

Figs. 1 and 2 are perspective views of a thermistor embodying the invention, the views being from opposite ends of the housing of the thermistor;

Fig. 3 is a longitudinal section on a larger scale and as seen on the plane of line 3—3 of Fig. 4;

Fig. 4 is a side elevation, with parts in section as seen upon the plane of line 4—4 of Fig. 3;

Fig. 5 is an exploded perspective view of the assembly which provides an insulated support for one of the wires upon which the thermistor bead is mounted;

Fig. 6 is an elevation of the assembly;

Fig. 7 is an elevation, with parts in section, of a tool or jig on which the elements of a thermistor mount are supported in position to receive a thermistor element; and Figs. 8 and 9 are fragmentary elevations on a large scale illustrating the thermistor element and its supporting wires at different stages of the assembly operation.

In the drawings, the reference numeral 1 identifies a short section of wave guide tubing which is closed at one end by a wall 2 and which is provided at its other end with any desired form of coupling 3 for securing the thermistor mounting to a wave guide system. Opposite walls of the tubing 1 have alined apertures over which a cap 4 and a bushing 5, respectively, are rigidly secured by soldering or brazing. The cap 4 and bushing 5 have tubular extensions which fit snugly within the apertures of the wave guide tube 1, and these extensions are accurately sized to locate the inner ends of the cap 4 and the bushing 5 in the planes of the opposed inner wall surfaces of the wave guide tube 1. The cap 4 is counterbored from its inner end to provide a cylindrical recess 4' having a length, measured from the inner surface of the wave guide tube 1, of λ/4, i. e., one-fourth of the wavelength of the microwave generator or transmission system with which the thermistor is to be used. Similarly, the inner end of the bushing 5 has a cylindrical bore 5' which opens into the wave guide tube 1, the effective length of the bore as measured from the inner surface of the wave guide being λ/4. These desired dimensions for the pockets 4', 5' are readily attained during manufacture of the cap 4 and bushing 5 when, as described above, the cap 4 and bushing 5 are formed with tubular extensions which pass through and terminate flush with the inner surfaces of the walls of the wave guide tube 1.

The wires 6, 7 which carry a thermistor T extend axially through the pockets 4', 5' respectively, and are supported by the cap 4 and bushing 5. The method of mounting the thermistor on wires 6, 7 to insure the accurate location of the thermistor bead at the center of the wave guide tube 1 will be described later.

The wire 6 is soldered to the cap 4 and the other wire 7 extends through the bore of a metal sleeve 8 which is axially arranged with respect to the outer counterbored section of the bushing 5. The inner end of the sleeve 8 terminates in a radial flange or head 9 which extends across the outer end of the pocket or bore 5' of the bushing 5, and the head 9 is insulated from the bushing 5 by a mica washer 10 of a preselected thickness which locates the inner face of the sleeve head 9 at the desired λ/4 distance from the wave guide passage. A powdered iron choke 11 surrounds the sleeve 8 and is seated against the outer face of the head 9, the choke being of somewhat less diameter than the counterbore of the bushing 5. Mica washers 12 are fitted over the outer end of the sleeve 8, the washers being of approximately the diameter of the outer end of the bushing 5 but having notches at their edges to clear the end projections 13 of the bushing. A metal washer 14 is arranged outside the mica washers 12 to prevent damage to the same when the choke 11 and washers 12 are rigidly assembled on the sleeve 8 by riveting or spinning a sleeve flange 15 over the washer 14. The length of the bushing extensions 13 is such that the washers 12 do not seat against the outer end of the bushing when the cap 16 is turned down upon the bushing to clamp the sleeve head 9 against the mica washer 10. The notches in the washers 12 fit about the extensions 13 to prevent rotation of the sleeve and core assembly within the bushing.

A compensating disk thermistor T' is mounted in a socket 17 which is soldered or brazed to the tube 1, and is resiliently supported between spring contact fingers 18 which are riveted or welded to the inner end wall of the socket and similar spring contact fingers 19 secured to a mica washer or cover plate 20 by spinning over the inner end of a terminal 21 which projects through and has a flange seated against the outer face of the mica cover plate 20. The electrical connection of the thermistor disk T' between the tube 1 and the terminal 21 is thereby effected automatically when a cover 22 is turned down upon the threaded socket 17. The terminal 21 is to be connected into the power measuring network in the usual manner.

The axis of the thermistor supporting wires 6, 7 is spaced from the end wall 2 of the wave guide tube by somewhat less than one-half the wavelength of the microwave system with which the thermistor assembly is to be used. Compensation for manufacturing errors is obtained by threading a screw 23 into the wave guide between the end wall 2 and the axis of the thermistor supporting wires. The projection of the compensating screw 23 into the wave guide has the same electrical effect as a displacement of the end wall 2 away from the thermistor T, and the desired electrical characteristics of the thermistor may therefore be obtained by turning the screw 23 into or out of the wave guide passage. The screw 23 is fixed in any desired adjusted position by staking the cap 4, as indicated by the recess 24, to interlock with the screw 23 to prevent further adjustment thereof. The outer end of the screw 23, i. e., the portion shown in dotted lines, is then cut off.

The described apparatus is preferably manufactured or assembled in the following manner to insure the location of the thermistor T at the geometrical center of a transverse plane through the wave guide tube 1. The pocket 5' of the bushing 5 is of a predetermined axial length, and the position of the inner end of the supporting wire 7 within the tube 1 is determined by the projection of the wire 7 beyond the head 9 of the sleeve 8 and the thickness of the washer 10. The wire 7 is inserted in the sleeve 8 and the sleeve head 9 is staked, as indicated by the recesses 25, and soldered to the sleeve. This operation may be effected in a jig or tool, not shown, which locates the inner end, i. e. the left end as shown in Fig. 7, of the wire 7 with respect to the face of the head 9. Alternatively, the parts may be assembled and interlocked with the inner end of the wire 7 projecting an arbitrary excess distance beyond the head 9. The excess length is then ground off or filed off to the exact predetermined length. The choke 11, insulating washer 12 and metal washer 14 are then assembled on the sleeve 8 and secured thereto by riveting, spinning or pressing the flange 15 of sleeve 8 into firm clamping engagement with the washer 14. The washer 10 is placed within the bushing 5, and the sleeve 8 assembly is slipped into the bushing and the cap 16 is turned down loosely on the bushing to hold the parts in assembled relation.

The casing or wave guide tube is then clamped in a tool or jig which is shown schematically in Fig. 7 as a base 26 with end plates 27, 28, and a bridge 29 slidable on the base 26. The end plates 27, 28 have alined pin clamps 30, 31, respectively, in which the outer end of the sleeve 8 and the thermistor supporting wire 6 may be clamped. The casing is mounted on the tool or jig by inserting the barrel of the bushing 5 in the opening of the bridge 29, and is clamped to the bridge by appropriate means which is shown schematically in the drawings as a screw 32. The bridge 29 is then moved to the right to project the outer end of the sleeve 8 into the pin clamp 30, and the clamp is adjusted to grip the sleeve 8. The cap 16 is then backed off and the bridge 29 is moved to the left to clear the inner end of the wire, and the wire 6 is passed through the pin clutch 31 and the cap 4 of the thermistor case. The inner end of the wire 6 is accurately adjusted to a predetermined distance from the inner end of the wire 7 by a thickness gage, not shown. The pin clutch 31 is clamped upon the wire 6 to maintain the desired spacing, and the leads of the thermistor T are then spot welded to the adjacent ends of the wires 6, 7, see Fig. 8. An appreciable amount of slack is left in the leads of the thermistor T to permit the adjustment of the thermistor bead into a central position at the axis of the supporting wires 6, 7, see Fig. 9. The free ends of the thermistor leads are then cut off or broken off, and the bridge 29 is moved to the right to seat the sleeve head 9 against the insulating washer 10. The cap 16 is turned down firmly upon the bushing 5 to seal the outer end of the bushing by clamping engagement with the insulating washers 12. Pin clamps 30, 31 are released, and the clamp screw 32 is backed off to permit removal of the thermistor casing from the assembly tool. The excess length of the wire 6 is cut off, and the outer end of the wire 6 is soldered to the cap 4 of the thermistor casing.

The bead of the thermistor T is accurately located at the axis of the wave guide tube by this process of assembly since the inner ends of the wires 6, 7 are symmetrically positioned with respect to the tube axis, and the thermistor bead is located centrally of the short gap between the wires 6 and 7. The mounted thermistor is then connected into a calibrating system, the screw 23 is adjusted to obtain a desired electrical effect, and the excess length of the screw 23 is cut off.

It is to be noted that the thermistor assembly is of relatively small size as the effective isolation of the direct current measuring circuit from the wave guide system is obtained by the pockets 4', 5' which each have an axial length of one-fourth of the wavelength of the microwave system.

It is to be understood that the invention is not limited to the particular embodiment herein shown and described as various changes which may occur to those familiar with the design and construction of thermistors fall within the spirit and scope of the invention as set forth in the following claims.

We claim:

1. A mounted thermistor comprising a wave guide tube closed at one end and having coupling means at the other end, said tube having alined openings in opposite walls thereof, cover members secured over said openings and each having a quarter-wavelength pocket extending outwardly from the inner surface of the tube wall to which it is secured, wires extending through said cover members axially of said pockets with their adjacent inner ends positioned symmetrically with respect to the axis of the wave guide tube, a thermistor secured to said wires with the bead thereof positioned substantially centrally of the gap between the adjacent inner ends of the wires, means sealing the outer ends of each wire in its supporting cover member, said sealing means insulating one wire from its cover member.

2. A mounted thermistor as recited in claim 1, wherein the axis of the thermistor supporting wires is spaced from the closed end of said wave guide tube by somewhat less than one-half wavelength, in combination with means mounted on said wave guide tube adjacent the closed end thereof and adjustable to project into the tube to determine an electrical characteristic of the mounted thermistor.

3. A mounted thermistor as recited in claim 1, wherein the axis of the thermistor supporting wires is spaced from the closed end of said wave guide tube by somewhat less than one-half wavelength, in combination with means mounted on said wave guide tube adjacent the closed end thereof and adjustable to project into the tube to determine an electrical characteristic of the mounted thermistor, and means locking said last mentioned means in a desired position of adjustment.

4. A mounted thermistor as recited in claim 1, in combination with a socket secured to said wave guide tube to receive a compensating disk thermistor, a cover of insulating material and means securing the same over said socket, a terminal mounted on said socket cover, and resilient contact means for engagement with the opposite faces of a disk thermistor to connect the same between the socket and said terminal when the cover is secured over said socket.

5. A mounted thermistor as recited in claim 1, in combination with a socket secured to said wave guide tube, resilient contact means at the base of said socket, a compensating disk thermistor in said socket and seated on said resilient contact means, a terminal having resilient contact means at its inner end to seat upon the outer face of the disk thermistor, and means securing said terminal to and insulating the same from said socket.

6. A mounted thermistor as recited in claim 1, wherein the cover members project into said openings of the wave guide tube and terminate in the respective planes of the inner surfaces of the opposite walls thereof.

7. A mounted thermistor comprising a wave guide tube having openings in its opposite walls alined transversely of the axis of the tube, a cap covering one opening and recessed from its inner face to provide a quarter wavelength pocket, a bushing secured over the other opening, said bushing having an inner bore with an axial length of a quarter-wavelength and being counterbored from its outer end, an insulating washer at the inner end of the counterbore, a hollow sleeve having a head seated against said washer, a magnetic material choke on said sleeve, means securing said sleeve and choke within and insulating the same from said bushing, a thermistor positioned substantially axially of said tube, and supporting wires for said thermistor extending through and secured to said cap and said sleeve respectively, the wire which extends through the cap being electrically connected thereto.

8. A mounted thermistor as recited in claim 7, wherein said cap has an end portion extending into its associated wave guide tube opening and terminating flush with the inner surface of the tube wall, whereby the quarter-wavelength pocket may be accurately formed in the cap prior to its assembly on the wave guide tube.

9. A mounted thermistor as claimed in claim 7, wherein said bushing has an end portion extending into its associated wave guide tube opening and terminating flush with the inner surface of the tube wall, whereby the quarter-wavelength bore in the bushing may be accurately formed prior to the assembly of the bushing on the wave guide tube.

10. The process of mounting a thermistor in a wave guide tube having openings in opposite walls over which a cap and a bushing respectively are secured, said process comprising securing a thermistor supporting wire to means for mounting the same within the bushing and with the inner end of the wire projecting a predetermined distance beyond said mounting means to extend approximately to but short of the axis of the wave guide tube, inserting said wire and its mounting means in said bushing, supporting said wave guide tube and said wire mounting means for relative movement axially of the supporting wire, displacing said tube and supporting means to position the inner end of the supporting wire outside of said bushing, inserting a second supporting wire through said cap and positioning its inner end in predetermined spaced relation to the first supporting wire, welding the leads of a thermistor to the adjacent ends of the supporting wires, displacing said tube and supporting means to position the supporting means within the bushing, and removing the excess length of the second supporting wire which projects beyond said cap.

11. The process as recited in claim 10, in combination with the step of soldering the second supporting wire to said cap.

12. The process of mounting a bead thermistor in a wave guide tube having a cap and bushing secured over openings in the opposite walls of a wave guide tube, the cap having an axial bore alined with the bore of the bushing; said process comprising securing a thermistor supporting wire in the bore of a headed hollow sleeve adapted to be mounted in the bushing, accurately determining the length of the inner end of the supporting wire projecting beyond said sleeve, positioning the wave guide tube and the sleeve with the bore of the cap axially alined with the supporting wire and with the inner end of the supporting wire outside of said bushing, inserting a second supporting wire through the bore of the cap and securing the same with the inner end thereof in predetermined spaced relation to the alined inner end of the first supporting wire, welding the leads of a thermistor bead to the adjacent ends of the supporting wires, effecting relative displacement of the wave guide tube and the axially alined supporting wires to position the sleeve within the bushing, and securing the sleeve within the bushing.

13. The process as recited in claim 12, wherein the supporting wires are secured in fixed positions, and the wave guide tube is displaced with respect thereto to position the sleeve within the bushing.

14. The process as recited in claim 12, wherein slack is left in the leads of the thermistor in the welding step, in combination with the step of adjusting the thermistor bead into substantially central position in the gap between the alined inner ends of the supporting wires.

FREDERICK H. DRAKE.
PAUL B. KING, Jr.

REFERENCES CITED

The following references are of record in the file of this patent:

UNITED STATES PATENTS

| Number | Name | Date |
| --- | --- | --- |
| 2,402,663 | Ohl | June 25, 1946 |
| 2,413,021 | Wolfson et al. | Dec. 24, 1946 |